May 21, 1957   A. RICKENMANN   2,792,824
DEVICE FOR THE DRESSING OF GRINDING WORMS
Filed Aug. 20, 1954   6 Sheets-Sheet 6

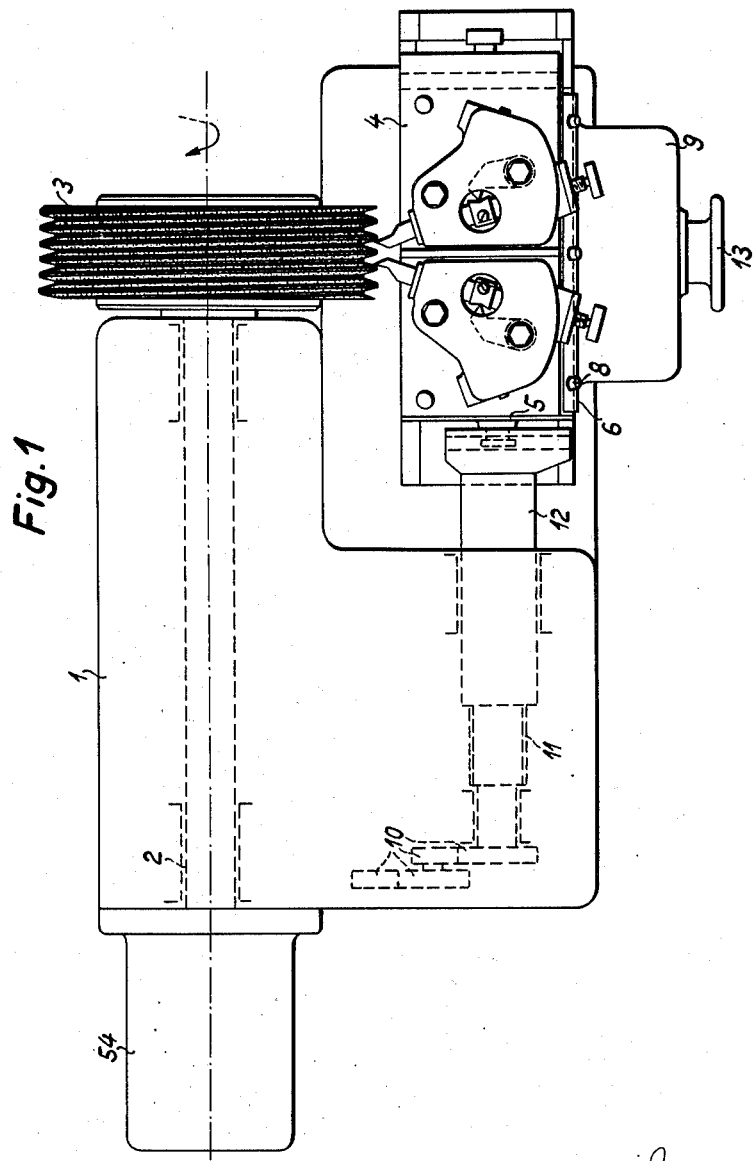

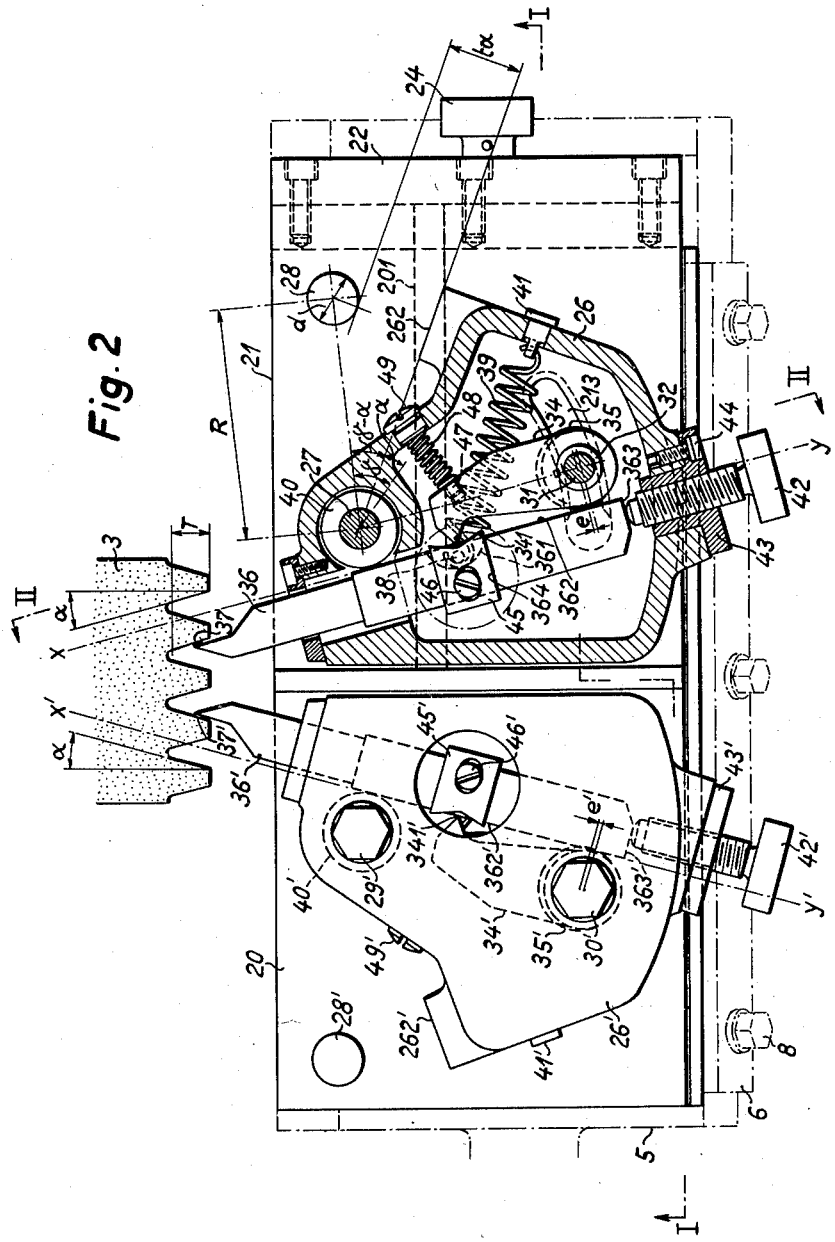

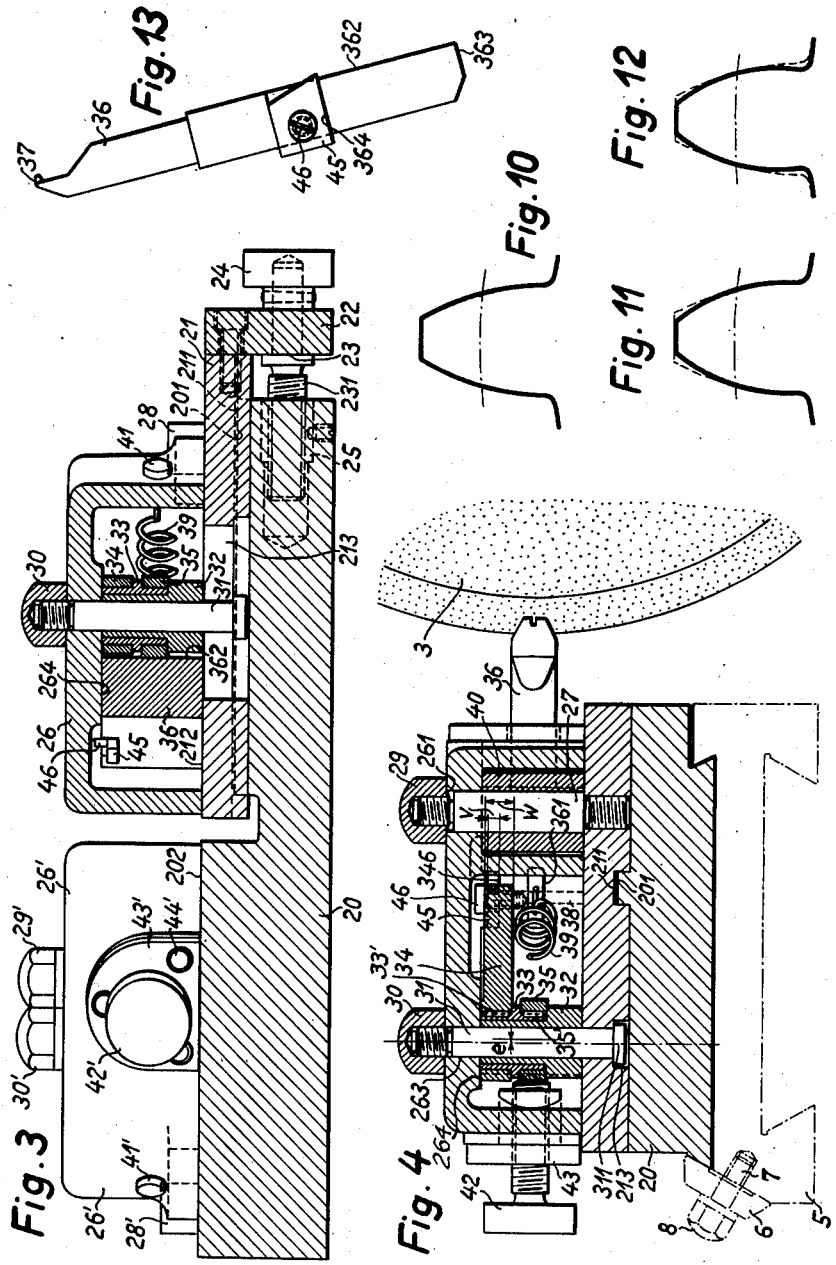

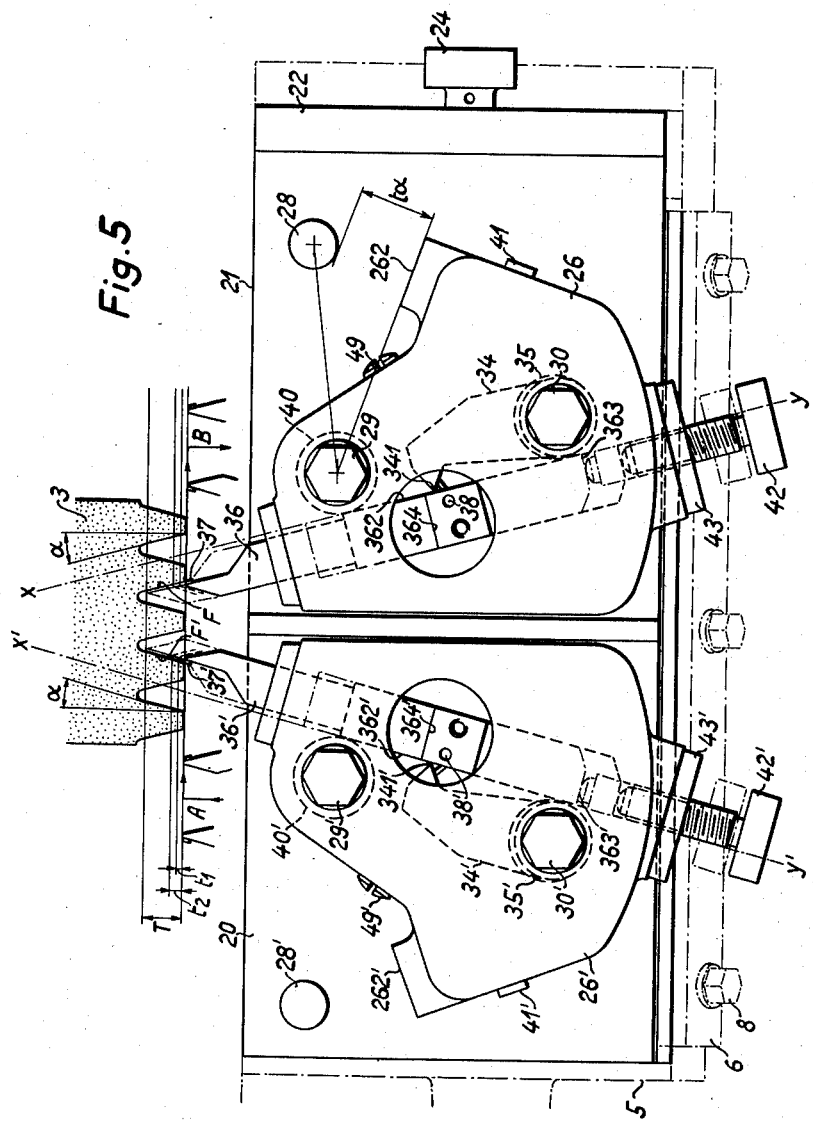

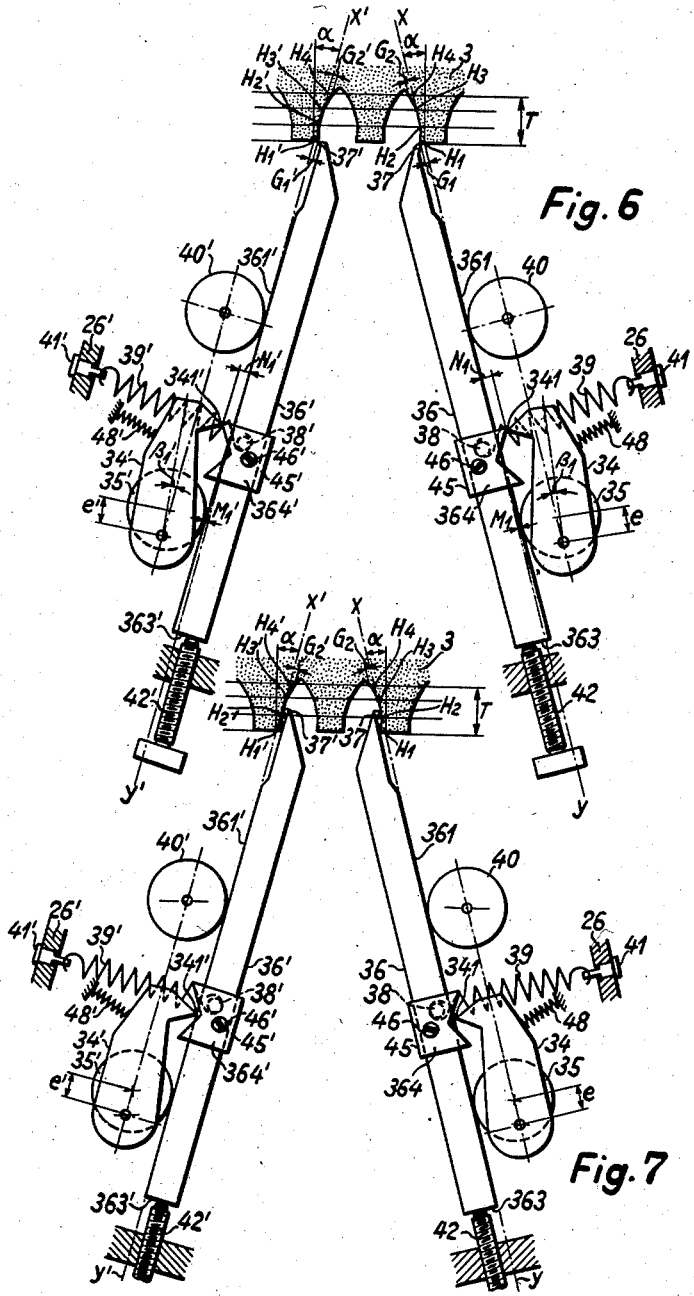

Inventor:
Alfred Rickenmann,
by Singer, Stern & Carlburg,
Attorneys.

United States Patent Office 2,792,824
Patented May 21, 1957

2,792,824

DEVICE FOR THE DRESSING OF GRINDING WORMS

Alfred Rickenmann, Kusnacht, Zurich, Switzerland, assignor to Reishauer-Werkzeuge A.-G., Zurich, Switzerland Application August 20, 1954, Serial No. 451,161

Claims priority, application Switzerland August 31, 1953

8 Claims. (Cl. 125—11)

The present invention relates to a device for the dressing of grinding worms operating on the generating principle i. e. in a manner similar to that of a gear hobbing machine.

It is an object of the invention to provide a device for the dressing of grinding worms allowing at will to dress the flanks thereof in straight lines for the production of involute teeth on the work piece, or in lines deviating from the said straight lines for the production of tooth profiles deviating as a whole or in part from the involute.

It is another object of the present invention to provide a device for the dressing of grinding worms at varying flank angles, corresponding to various pressure angles of the toothing to be ground.

It is in particular an object of the invention to provide a device for the dressing of grinding worms at will symmetrically or asymmetrically for the production of toothing deviating at one surface of the tooth only from the involute or deviating differently therefrom on its two tooth surfaces.

It is another particular object of the invention to provide a device for the dressing of grinding worms deviating at will from the said straight line either on that portion of the flank which corresponds to the tip only of the toothing to be ground, or both on the portions corresponding to the tip and to the root of the said toothing.

These and other objects and features of the present invention will become clearer from the following detailed description.

In the accompanying drawing an embodiment of the device according to the invention is illustrated by way of example as far as necessary for the understanding of the invention. In the drawing, Fig. 1 shows a device in plan view, Fig. 2, a plan view with some components in section, Fig. 3, an elevation and sectional drawing along the line I—I of Fig. 2, Fig. 4, a section along the line II—II of Fig. 2, Fig. 5, a plan view of the dressing device in the starting position of the dressing process, Figs. 6 to 8 are diagrammatic representations on a modified scale of various phases of the dressing process.

Fig. 10 shows a tooth of a gear, the surfaces of which are delimited by involutes;

Figure 8:
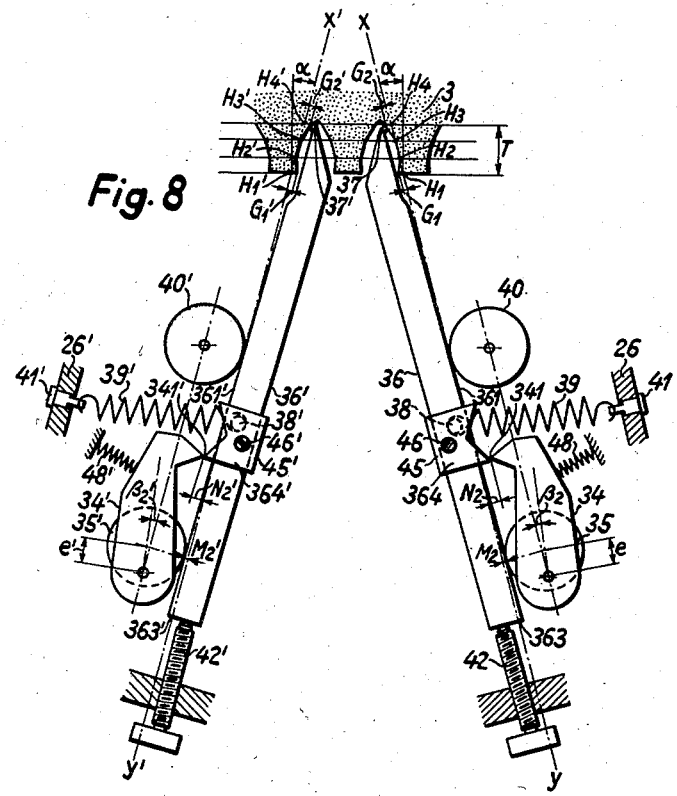

Fig. 11 a tooth of a gear, the surfaces of which deviate at the tip of the tooth from the associated involutes;

Fig. 12 a tooth of a gear, the surfaces of which deviate at the root and at the tip of the tooth from the associated involutes;

Fig. 13 shows a detail of the dressing mechanism.

The dressing of a grinding worm can be compared with the cutting of a screw thread on a screw thread cutting machine. This method can be assumed to be known so that here a detailed explanation thereof may be dispensed with. The present invention does not relate to the control mechanism but to the dressing mechanism. A control mechanism designed for the dressing of grinding worms is described and illustrated in all details in the U. S. Patent Specification No. 2,619,950.

In a casing 1 (Fig. 1) of a gear grinding machine operating according to the generating principle a spindle 2 is journalled rotatably. It carries the grinding worm 3 serving as the grinding tool, which in the embodiment illustrated is of single-start right hand thread. In the present embodiment the dressing of the flanks of this grinding worm 3 by the aid of the device constructed according to the invention is to be contemplated.

During the dressing process the spindle 2 and the grinding worm 3 are driven by the motor 54 at dressing speed, and rotate in the sense of rotation as indicated in Fig. 1. The rotational speed of the grinding worm 3 during the dressing process is much lower than when grinding.

The dressing device 4 (Fig. 1), which preliminarily is considered as a whole, is fixed on a slide 5 by means of a clamp 6 as well as of the screws 7 and nuts 8. The slide 5 is mounted shiftably on the radial slide 9, for example in dovetail guides, and can be displaced parallel to the axis of the grinder spindle 2.

Figure 9:
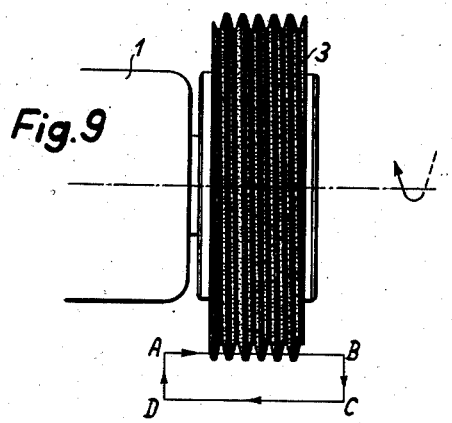
Fig. 9 is a diagrammatic representation of the cycle of motions when dressing a grinding worm.

The radial slide 9 runs in turn in guide-ways (not shown) which are arranged at right angles to the axis of the grinder spindle. The hand wheel 13 serves for adjusting this radial slide 9. When dressing the grinding worm the dressing device 4 undergoes an automatically directed cycle of motions of four phases, as illustrated in Fig. 9. During the phase called "working stroke" which comprises the path A—B (see also Fig. 5), the dressing tools act upon the flanks of the grinding worm 3. The dressing device 4 is then in the working position, and is shifted from the left to the right parallel to the axis of the spindle at a speed which is accurately determined by the pitch and the rotational speed of the grinding worm 3. The drive of the slide 5 with the dressing device 4 mounted on it is derived from the grinder spindle 2, and is effected for example by means of the change gears 10, which are to be inserted in accordance with the pitch of the grinding worm 3 to be dressed, a lead screw 11 and a lead screw nut 12.

At the end of the "working stroke" a radial withdrawal B—C of the radial slide 9, with the dressing device 4 mounted on it is carried out. Subsequently begins the return stroke from C to D, which is normally carried out at a higher speed. During this phase of the control cycle the dressing tools are completely outside the range of the grinding worm 3. After the termination of the return stroke the radial slide 9 is advanced from D to A and thereby the dressing device is restored to the working position. As soon as this is the case, another "working stroke" from A to B begins, i. e. the control motions follow one another in the manner described, until the dressing process can be terminated.

The basis of the dressing device is formed by the base plate 20. The portion thereof lying on the right hand side (Fig. 2) carries the slide 21. For the guidance of the latter serve the longitudinal groove 221 and the guide ledge 201 arranged on the base plate 20, which runs parallel to the axis of the grinder spindle 2. On the slide 21 the plate 22 is screwed fast, wherein the spindle 23 is journalled rotatably. The same is provided with a grip 24, and its threaded portion is in engagement with a nut 25 inserted in and attached to the base plate 20.

The surface 212 of the slide 21 and the surface 202 on the left hand side of the base plate 20 are on the same level, (Fig. 3) and each carries a dressing head 26 and 26', respectively.

The pin 27 penetrating through the bore 261 is screwed fast to the slide 21 and is provided with a nut 29. It centres the dresser head 26 and the sleeve 40. On the dresser head 26 an abutment face 262 is provided which lies in a plane radial with respect to the pin 27. Moreover in the slide 21 an accurately calibrated pin 28 is screwed fast which has a diameter $d$ and the centre of which is arranged at a distance R from the centre of the pivot or of the pin 27, respectively.

In the present embodiment (Fig. 2) the dressing device is adjusted for a pressure angle $\alpha$. In these circumstances there is a distance $t\alpha$ between the pin 28 and the abutment face 262. Between the aforesaid radial plane and the straight line connecting the "centre of pin 27" to the "centre of pin 28" an angle $\gamma$ is indicated, which is established when the pressure angle $\alpha=0°$ (see Fig. 2). Taking these fundamentals into consideration the distance $t\alpha$ can be calculated from the following formula:

$$t\alpha = R \sin (\gamma - \alpha) - \frac{d}{2}$$

The distance $t\alpha$ computed for the pressure angle $\alpha$ desired is for example composed of block gauges to a block of corresponding thickness which is placed between the pin 28 and the abutment face 262. The adjustment of the pressure angle $\alpha$ desired on the dresser head 26 is effected in such a manner that the latter is turned until the aforesaid set of block gauges is clamped without play between pin 28 and the abutment face 262. As soon as this is the case, the position of the dresser head 26 is fixed by tightening of the two nuts 29 and 30.

The nut 30 is mounted on a threaded bolt 31, is centred and guided in the bore 263 of the dresser head 26; when the nut 30 is tightened, the head 311 of the threaded bolt bears on the contact face of a ⊥-shaped slot 213 in the slide 21.

Between the surface 212 of the slide 21 and the cover face 264 on the dresser head 26 a sleeve 32 is placed which is guided by the screw bolts 31. The sleeve 32 carries in turn a rotatably mounted sleeve 33, on which the lever 34 and the disc 35 are keyed as at 34' and 35'. The outer circumference of the disc 35 is eccentrical to the axis of the bore. The eccentricity denoted $e$ is indicated in Figs. 2 and 4.

The portion having a rectangular cross section of the diamond holder 36 is fitted adjustably between the surface 212 of the slide 21 and the cover face 264. The portion lying nearer to the grinding worm has a cylindrical cross section, and carries at its forward end a diamond tool 37. In the middle portion of the diamond holder 36 a cylindrical pin 38 is arranged which, together with the slot-shaped recess 361 allows the attachment of the tension spring 39. The other end of the same is hooked into the eyelet 41 which is in turn fixed to the dresser head 26. This tension spring has the effect that the side face 362 of the diamond holder 36 is constantly pressed against the sleeve 40 and the disc 35, and the front face 363 is pressed against the screw 42. The latter is screwed into a nut 43 which is attached to the dresser head 26 by means of screws 44.

The diamond holder 36 has a groove 364 left free, into which a templet 45 is inserted with a sliding fit and retained by a screw 46. The thickness W of this templet 45 is smaller than the width V of the feeler 341 on the lever 34 (see Fig. 4). The latter is provided with a guide pin 47, which serves as a guide to the compression spring 48. This compression spring 48 bears on the lever 34 and on the end face of the screw 49 which is mounted in the dresser head 26. The spring 48 has the effect that the feeler 341 contacts the templet 45 or the side face 362 constantly without play. The force which accordingly acts on the diamond holder 36 is, however, in any condition of operation smaller than that which is applied in the reverse direction by the tension spring 39 so that a faultless contact of the diamond holder 36 on the sleeve 40 and on the disc 35 is safeguarded at any time.

The components mounted on the dresser head 26' conform in shape, purpose and manner of operation with those of the dresser head 26, but are arranged symmetrically thereto. When such component will have to be referred to in the following description of the dressing process, they will be denoted by the same reference characters as the corresponding components of the dresser head 26', but will have an additional dash.

The present example shows an embodiment of a dressing device, in which both diamond holders 36, 36' are shifted by two associated screws 42, 42', respectively. However, embodiments are also possible, in which both diamond holders are controlled from a central point, so that one adjustment member only is required for both holders as shown in my United States Patent No. 2,619,950, December 2, 1952.

For the consideration of the dressing process the following initial position will be chosen:

The radial slide 9 is for example adjusted by the hand wheel 13 and a threaded spindle (not shown) in such a manner that the dressing device assumes during the "working stroke" the position shown in Fig. 5. The dressing device is so placed and fixed on the slide 5, that the diamond tool 37' assumes the position required for dressing the corresponding flank F' of the grinding worm 3. The diamond tool 37 has been moved into the position prescribed for the dressing of the flank F by shifting the slide 21 by the aid of the spindle 23 and the grip 24. The position of the two dresser heads 26, 26' is determined by the pressure angle $\alpha$ required, the distance $t\alpha$ having been calculated accordingly and having been accurately kept when adjusting.

When gears are to be ground which have no modification of the tooth profile and have teeth delimited by involutes (see Fig. 10), the flanks of the grinding worm have to be dressed absolutely straight.

In this case the diamond tools 37, 37' may have a straight cutting edge of the length desired. Templets 45, 45' are not required.

During the dressing process the diamond tools 37, 37' are shifted stepwise by the control mechanism shown in Patent 2,619,950 and is moved along the corresponding flanks F, F' until the latter are smoothly finished, without interruptions, to the profile depth T as required for the grinding.

When starting from the position illustrated in Fig. 5, care must be taken that the ends of the diamonds 37, 37' directed towards the grinding worm 3 conform with the outer diameter thereof. At each "working stroke" the diamonds 37, 37' operate at a different depth of the profile, for example at the depth $t_1$, then at the next "working stroke" at the depth $t_2$ and so on, until the required depth T is reached.

The succession of operations is carried out in that the diamond holders 36, 36' and the associated diamond tools 37, 37' are shifted, by turning the screws 42, 42' the corresponding amounts (e. g. $t_2-t_1$). In these movements the side faces 361, 361', arranged parallel to the cutting edge of the diamond tools 37, 37', of the diamond holders 36, 36' slide on the sleeves 40, 40' and on the discs 35, 35'. On the other hand, the feelers 341, 341' of the levers 34, 34' slide upon the side faces 362, 362' of the diamond holders 36, 36'. It is to be noted, that in these longitudinal movements of the diamond holders 36, 36' the positions of the levers 34, 34' do not undergo any changes. Consequently the straight connecting lines $x$—$y$, $x'$—$y'$ between the outer diameters of the discs 35, 35' and sleeves 40, 40', i. e. between the contact points of the diamond holders 36, 36' have exactly the inclination corresponding to the pressure angle $\alpha$ adjusted. The flanks F, F' of the grinder helix 3 are dressed forcibly as perfectly straight lines, and their inclination conforms with the corresponding straight lines $x$—$y$ or $x'$—$y'$ of the pressure angle.

When gears are to be ground the teeth of which have modifications on the tip or on the root of the profile, as shown e. g. in Fig. 12 in an exaggerated manner, the shape of the flanks deviates either over the whole range contemplated, or if desired only in sections from the straight line determined by the pressure angle of the toothing to be ground.

In order to carry out the dressing process, the modifications to be considered on the flanks of the grinding worm 3 have to be determined on the basis of the tooth shape required of the work piece. For the present example (see Fig. 6) it is to be assumed that at the outer diameter the deviations $G_1$, $G_1'$ and at the depth T those of $G_2$, $G_2'$ from the straight flanks $H_1$, $H_2$, $H_3$, $H_4$, $H_1'$, $H_2'$, $H_3'$, $H_4'$ have to be taken in consideration. Otherwise the curve of the tooth profile should follow the involute in the range of the pitch circle diameter. The portions of the grinding worm corresponding to this section form the straight lines $H_2$, $H_3$, $H_2'$, $H_3'$ which have the inclination corresponding to the pressure angle $\alpha$.

The templets mounted on the diamond holders 36, 36' are so adjusted that the feelers 341, 341' of the levers 34, 34', during the dressing of the tooth portions "$H_2$" and "$H_3$+depth $T$," "$H_2'$" and "$H_3'$+depth $T$," slide upon the control faces thereof, and when dressing the straight line portions $H_2$—$H_3$, $H_2'$—$H_3'$ are in contact with the side faces of the diamond holders 362, 362'.

The diamonds 37, 37' used when dressing such profiles have a cutting edge of short length which is moreover slightly convex. By this last mentioned measure it is prevented that in accordance with the shape and run of the curved flank to be dressed a non-permissible under-cutting of the profile line could be effected by the beginning or end of a straight line cutting edge.

For considering the dressing process, the same starting position is to be assumed as when dressing the flanks F, F', delimited by straight lines, of the grinding worm 3 (the slide 5 moves in the "working stroke," the diamonds 37, 37' stand at the outer diameter of the grinding worm 3, the dresser heads are adjusted for the pressure angle $\alpha$.

The modifications required, $G_1$, $G_1'$, at the outer diameter are attained in that the angular position of the diamond holders 36, 36' with respect to their initial position (which is determined by the pressure angle $\alpha$, planes $x$—$y$, $x'$—$y'$) is altered in such a manner that the diamond tools 37, 37' are offset the desired amounts $G_1$, $G_1'$ from the straight flank lines $H_1$, $H_2$, $H_3$, $H_4$, $H_1'$, $H_2'$, $H_3'$, $H_4'$.

The change of position of the diamond holders 36, 36' is attained by displacing the contact points on the disc 35, 35'. For this purpose the turning of the levers 34, 34' is required, which are in turn controlled by the templets 45, 45'. In the present situation the translations coordinated to the modfications $G_1$, $G_1'$ amount to $M_1$, $M_1'$, the angle to $\beta_1$, $\beta_1'$, and the heights of the templets required at these points to $N_1$, $N_1'$. In general it applies, that to each deviation G on the flanks of the grinding worm 3 a height N on the templet 45 or 45' is coordinated.

During the dressing process, the diamond tools 37, 37' operate at each "working stroke" on a different depth of the profile as explained with reference to the dressing of straight flanks. The shifting of the diamonds is imposed likewise by the aid of the screws 42, 42'.

In the present case, for the portions $H_2$ and $H_2'$, respectively, it is demanded that with increasing depth of the profile the modification decrease successively so as to reach the value of zero at the points $H_2$, $H_2'$. The templets 45, 45' are shaped and mounted on the diamond holders 36, 36' accordingly. The feelers 341, 341' of the levers 34, 34' slide on the sloping control faces of the templets 45, 45' during the dressing of the portions contemplated. During the working period which is characterised by the decrease the modifications on the flanks from $G_1$, $G_1'$ to zero, the heights $N_1$, $N_1'$ on the templets 45, 45', the angles $\beta_1$, $\beta_1'$, and the displacements $M_1$, $M_1'$ likewise diminish towards zero. As soon as the feelers 341, 341' have left the templets 45, 45' and contact the side faces 361, 361', the diamond holders 36, 36' and the diamond tools 37, 37' are in a position, which corresponds exactly to that one which is prescribed for the dressing of completely straight flanks inclined under the pressure angle $\alpha$.

Accordingly on the flanks of the grinding worm 3 straightly dressed sections are formed, which are inclined at the pressure angle $\alpha$, as long as the feelers 341, 341' slide on the side faces 361, 361', which in the present examples applies to the portions $H_2$—$H_3$, $H_2'$—$H_3'$ of the flanks (see Fig. 7). From the point $H_3$, $H_3'$ onward the angular position of the diamond tools 37, 37' is again controlled by the templets 45, 45'. The control faces, which rise there effect a gradually increasing tilting of the levers 34, 34', correspondingly increasing translations of the contact points on the discs 35, 35', and a consequential variation of the angular position of the diamond holders 36, 36', so that with increasing depth of the profile larger modifications are effected which on the depth T attain the values $G_2$, $G_2'$ coordinated to the heights $N_2$, $N_2'$ on the templets 45, 45' prevailing there (see Fig. 8).

When with the device illustrated profiles have to be generated in which the flanks to be dressed of the grinding worm 3 do not conform in any section or at points only with the straight flanks inclined under the pressure angle $\alpha$, the position of the dresser heads 26, 26' is based on the pressure angle $\alpha$, whereas the effective angular position of the two diamond holders 36, 36' is controlled exclusively by the templets 45, 45'. The feelers 341, 341' do not contact in these circumstances the lateral faces 362, 362' during the dressing process at all, or at single points only.

When the gears are to be ground, the teeth of which require modifications on the tip of the tooth only (see Fig. 11), then on the grinding worm 3 deviations from the straight line of the flanks according to the pressure angle are required merely in the neighborhood of the root of the profile (for example from the point $H_3$:depth $T$, or point $H_3'$ to the depth T). The rest is completely straight. The templets 45, 45' to be used have one control face only, as shown for example in Fig. 13.

When modifications are required at the root of the tooth only, then merely, the portion adjacent the outer diameter of the grinding worm 3 deviates from the straight line of the pressure angle. The shape of the templets 45, 45' to be used in this case as comparable to that according to Fig. 13; merely the control face has to be arranged on the side facing the screws 42.

Moreover it is conceivable that gears are demanded on which the two smooth surfaces are formed asymmetrically, so that for example one tooth surface follows an involute, whereas the other one has modifications. In this case one flank of the grinding worm 3 is completely straight, while the other one is to be dressed in accordance with the modifications; one of the diamond holders, e. g. 36, does not then carry a templet 45, while the other diamond holder 36' is provided with a templet shaped in accordance with the modifications required.

In this connection there exists also the possibility that modifications are required on both surfaces of the tooth which have different magnitudes (e. g. $G_1 \neq G_1$; $G_2 \neq G_2'$). In these circumstances both diamond holders 36, 36' carry their control templet 45, 45'. The same have no symmetrical shape and can not be brought into mutual cover since e. g. $N \neq N'$.

While I have herein described and illustrated in the accompany drawing what may be considered a typical and particularly useful embodiment of my said invention, I wish it to be understood that I do not limit myself to the particular details and dimensions described and illustrated, for obvious modifications will occur to a person skilled in the art.

What I claim as my invention and desire to secure by Letters Patent, is:

1. A device for the dressing of grinding worms comprising in combination: driving means rotationally coupled to the grinding worm to be dressed, two diamond holders, a dressing diamond mounted on each of the said diamond holders, two dresser heads arranged symmetrically to one another with respect to the flanks of the grinding worm to be dressed, the said diamond holders being respectively inserted into and guided in one of the said dresser heads so as to move the said dressing diamonds along the flanks of the said grinding worm at the selected depth of dressing, and adjustment means adjusting the angular position of the said dresser heads within predetermined limits to the pressure angle desired to be produced by the said grinding worm, wherein the said diamond holders are pivotally mounted in the dresser heads, and comprising in addition, a fixed abutment and an adjustable abutment, and pressure means engaging the said diamond holders and adapted to urge each diamond holder in constant contact with its corresponding fixed and adjustable abutment, control templets connected to each of the said diamond holders, feeler levers pivoted in the said dresser heads each of said levers being adapted to contact alternately its corresponding templet and a face of the associated diamond holder, disks mounted eccentrically to the axis of the said feeler levers and coupled to the said levers, the circumferences of the said disks forming the said adjustable abutments.

2. A device for the dressing of grinding worms comprising in combination: driving means rotationally coupled to the grinding worm to be dressed, two diamond holders, a dressing diamond mounted on each of the said diamond holders, the dresser heads arranged symmetrically to one another with respect to the flanks of the grinding worm to be dressed, the said diamond holders being respectively inserted into one of the dresser heads and guided therein so as to move the said dressing diamonds along the flanks of the said grinding worm at the selected depth of dressing, adjustment means for adjusting the angular position of the said dresser heads within predetermined limits to the pressure angle desired to be produced by the said grinding worm, the said dresser diamond holders being pivotally mounted in the said dresser heads, a fixed abutment and an adjustable abutment, pressure means engaging the said diamond holders adapted to urge said diamond holders in constant contact with its corresponding set of fixed and adjustable abutment, a single control templet connected to each of said diamond holders, a feeler lever pivoted in each of said dresser head and adapted to contact its corresponding templet and a face of said diamond holders respectively, and disks mounted eccentrically to the axes of said feeler levers and coupled to the said levers, the circumferences of the said disks forming the said adjustable abutments.

3. A device for the dressing of grinding worms comprising in combination: driving means rotationally coupled to the grinding worm to be dressed, two diamond holders, a dressing diamond mounted on each of the said diamond holders, two dresser heads arranged symmetrically to one another with respect to the flanks of the grinding worm to be dressed, the said diamond holders being respectively inserted into and guided in one of the said dresser heads so as to move the said dressing diamonds along the flanks of the said grinding worm at the selected depth of dressing, adjustment means for adjusting the angular position of the said dresser heads within predetermined limits to the pressure angle desired to be produced by the said grinding worm, the said diamond holders being pivotally mounted in the said dresser heads, a fixed abutment and an adjustable abutment, pressure means engaging the said diamond holders adapted to urge each diamond holder in constant contact with its corresponding fixed and adjustable abutment, control templets differing from one another in shape connected to said diamond holders respectively, a feeler lever pivoted in each of said dresser heads with each lever adapted to alternately contact its corresponding templet and a face of the associated diamond holder, and disks mounted eccentrically to the axes of the said feeler levers and coupled to the said levers, the circumferences of the said disks forming the said adjustable abutments.

4. In a device for dressing grinding worms in combination: driving means rotationally coupled to the grinding worm to be dresesd, slide means connected to said driving means to move axially of said worm to be dressed, a tool holder pivotally mounted on said slide means, an abutment surface on the slide means and on said tool holder adapted to receive therebetween gauge blocks to adjust said tool holder to a preselected position equal to the pressure angle desired to be produced by the grinding worm, a diamond tool slidably and rockably mounted in said tool holder, templet means removably mounted on said diamond tool to cause said diamond tool to be moved along a prescribed pathway and dress the flank of the grinding worm teeth of a preselected contour, and yielding means for holding said dressing tool in a preselected position and to permit said dressing tool to be moved along a straight line path when said templet is removed.

5. In a device for dressing grinding worms in combination: driving means rotationally coupled to the grinding worms to be dressed, slide means connected to said driving means to move in a direction axially of said worm, a tool holder pivotally and adjustably mounted on said slide means, means for adjusting said tool holder to a preselected angle equal to the angle of attack to be produced by the grinding worm, a tool rockably and slidably mounted in said tool holder, a diamond cutter on said tool, a templet removably attached to said tool, templet engaging means in the path of said templet carried by said tool holder, and spring means for urging said tool in contactual engagement with guide surfaces in the tool holder to permit said tool to be moved along a straight line path when said templet is removed.

6. In a device for dressing grinding worms in combination: driving means rotationally coupled to the grinding worms to be dressed, a slide adapted to be driven by said driving means to move along the worm to be dressed in a direction axially thereof, a tool holder mounted on said slide, means for adjusting the tool holder to a preselected pressure angle, a tool rockably and slidably mounted in said tool holder, said tool being provided with a diamond cutting tip adapted to be presented to the flank of the grinding worm, a templet removably connected to said tool, tool rocking means carried by said tool holder, an arm on said too rocking means adapted to be engaged by said templet to rock said tool a predetermined angular distance as said tool is moved longitudinally, and means for moving said tool in a longitudinal direction.

7. In a grinding worm dressing tool, a slide adapted to be reciprocated in timed relation to the rotational speed of a grinding worm to be dressed, a tool holder pivotally mounted on said tool holder, means for adjusting said slide to a predetermined angle, a tool rockably and slidably mounted in said tool holder, a diamond cutter on said tool, a templet removably mounted on said tool, tool rocking means pivotally carried by said tool holder, an arm on said tool rocking means having a projection extending into the path of said templet, means for feeding said tool longitudinally, and yielding spring means connecting said tool and tool holder to permit said tool to be moved along a straight line path when said templet is removed.

8. In a grinding worm dressing tool, a slide movable in timed relation to the rotary speed of the worm to be dressed, a fulcrum surface in said tool holder a tool holder mounted on said slide, a diamond tool slidably and rockably mounted on said fulcrum surface in said tool holder, tool rocking means mounted in said tool holder, an arm on said tool rocking means having a projection, a templet removably attached to said tool to permit said tool to be rocked a predetermined angular distance when the same is moved longitudinally such that the diamond point of said tool will inscribe a surface on the flank of the worm similar to the templet and permit said tool to be moved in a straight line path when said templet is removed so that said diamond tool will inscribe a straight line cut on the flank of the grinding worm, and spring means for urging said tool laterally in a direction toward said fulcrum surface in said tool holder and said tool rocking means.

References Cited in the file of this patent

UNITED STATES PATENTS

| | | |
|---|---|---|
| 1,574,303 | Olson | Feb. 23, 1926 |
| 1,623,113 | Hanson | Apr. 5, 1927 |
| 1,715,697 | Eberhardt | June 4, 1929 |
| 2,067,178 | Edgar | Jan. 12, 1937 |
| 2,619,950 | Rickenmann | Dec. 2, 1952 |
| 2,659,357 | Osplack | Nov. 17, 1953 |